US011036682B2

(12) United States Patent
Duncan-Wilson et al.

(10) Patent No.: US 11,036,682 B2
(45) Date of Patent: Jun. 15, 2021

(54) FLEXIBLE ENERGY INFORMATION AGGREGATION

(71) Applicant: ORACLE INTERNATIONAL CORPORATION, Redwood Shores, CA (US)

(72) Inventors: Jason James Duncan-Wilson, Cincinnati, OH (US); Timothy James McAuliffe, Middletown, CT (US); Oleg Kobchenko, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 458 days.

(21) Appl. No.: 15/993,737

(22) Filed: May 31, 2018

(65) Prior Publication Data

US 2019/0370352 A1 Dec. 5, 2019

(51) Int. Cl.
*G06F 16/16* (2019.01)
*G06F 16/182* (2019.01)
(Continued)

(52) U.S. Cl.
CPC .......... *G06F 16/168* (2019.01); *G06F 3/0482* (2013.01); *G06F 16/182* (2019.01); *G06F 16/2282* (2019.01); *G06F 16/244* (2019.01)

(58) Field of Classification Search
CPC combination set(s) only.
See application file for complete search history.

(56) References Cited

U.S. PATENT DOCUMENTS

| 2007/0245224 A1 | 10/2007 | Hsu |
| 2013/0151491 A1* | 6/2013 | Gislason ............. G06F 16/2282 707/696 |

(Continued)

FOREIGN PATENT DOCUMENTS

| CN | 102 411 598 A | 4/2012 |
| CN | 106 547 765 A | 3/2017 |

OTHER PUBLICATIONS

Patent Cooperation Treaty (PCT), International Search Report and Written Opinion issued in PCT International Application No. PCT/US2019/032102, PCT International Filing Date of May 14, 2019, dated Aug. 5, 2019 (12 pgs).

(Continued)

*Primary Examiner* — Muluemebet Gurmu
(74) *Attorney, Agent, or Firm* — Kraguljac Law Group, LLC

(57) ABSTRACT

Systems, methods, and other embodiments associated with flexible aggregation of energy information are described. In one embodiment, a method includes receiving a request via a graphical user interface that comprises a plurality of selectable inputs that define the request. A plurality of energy dimensions are selected from a set of available energy dimensions, a plurality of combinations of the plurality of energy dimensions are determined, an energy bucket is generated for each combination of the plurality of energy dimensions, and the script is generated based upon the energy buckets. A target database is accessed on a remote target server, and the script is executed on the target database to initiate extraction of data that matches each energy bucket into a dynamic table in the target database, and run an energy option on the data extracted into the dynamic table.

20 Claims, 13 Drawing Sheets

(51) Int. Cl.
    *G06F 16/22*     (2019.01)
    *G06F 16/242*     (2019.01)
    *G06F 3/0482*     (2013.01)

(56) References Cited

U.S. PATENT DOCUMENTS

| | | |
|---|---|---|
| 2013/0246257 A1 | 9/2013 | Burke |
| 2016/0247084 A1* | 8/2016 | Miller .................. G06F 16/254 |
| 2019/0095478 A1* | 3/2019 | Tankersley .......... G06F 16/2379 |

OTHER PUBLICATIONS

Wikipedia (Original Author—Arbor Software Corporation), "Essbase", Jun. 2016, pp. 1-6, downloaded from: https://en.wikipedia.org/wiki/Essbase on Dec. 21, 2017.

* cited by examiner

ENERGY DIMENSION DATA STRUCTURE — 130

| ATTRIBUTE 1 (305) | ATTRIBUTE 2 (310) | ATTRIBUTE 3 (315) | ENERGY DIMENSION (320) |
|---|---|---|---|
| TYPE (1) | TYPE (1) | TYPE (1) | ENERGY DIMENSION (1) |
| TYPE (2) | TYPE (2) | TYPE (2) | ENERGY DIMENSION (2) |
| TYPE (3) | TYPE (3) | TYPE (3) | ENERGY DIMENSION (3) |
| TYPE (4) | TYPE (4) | TYPE (4) | ENERGY DIMENSION (4) |
| TYPE (5) | TYPE (5) | TYPE (5) | ENERGY DIMENSION (5) |

• • •

FIG. 3D

FLEXIBLE ENERGY INFORMATION AGGREGATION

BACKGROUND

Computing devices are used to implement various services and products. For example, a team of programmers may use a group of computing devices to develop an energy data collection service. The energy data collection service may be configured to assemble energy-related data associated with utility systems.

The service is designed to gather many types of energy-related data. Each type of energy-related data can vary, depending upon the source from which the type of energy-related data was retrieved. For example, different energy-related data can have different formats, parameters or values.

The energy-related data assembled by the energy data collection service can be used to perform a task, such as analyze energy-related behavior, identify trends, take physical action, etc. To do so, data relevant to the task needs to be identified for further processing. Accordingly, the team of programmers may interact with each of the computing devices to analyze the energy-related data and manually write code capable of identifying and retrieving the relevant data.

Analyzing the energy-related data and manually writing code are resource-intensive tasks. The analyzing and code writing involves much interaction by the team of programmers. Even after the analyzing and code writing have been completed, testing the written code is also resource-intensive and takes days or weeks to complete. As a result, the ability to perform a requested task has involved significantly delays, and/or has been prohibitively expensive.

In order to improve the performance of the computing devices, improve the speed at which the relevant data is identified so that a specified task can be performed, and decrease the resources needed to do the same, it is desirable for the providers of the services to be able to efficiently aggregate energy-related data.

Unfortunately, typical existing techniques are limited to using professional programmers to manually write custom code for a specified task, or implement inflexible querying methods that require knowledge of data structures to properly search and return correct data records. These custom query systems, thus, produce inaccurate results by returning inaccurate data records due to errors in the query itself. For example, a query may aggregate energy-related data that is irrelevant to a desired task, or fail to identify and aggregate some energy-related data that is relevant to the desired task. Thus, the aggregation of energy-related data has been restricted by time-consuming and resource-consuming processes that cause significant delay and much inaccuracy.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 3D illustrates an embodiment of a system associated with flexible energy information aggregation, where a plurality of energy dimensions are stored in an energy dimension data structure.

DETAILED DESCRIPTION

Figure 1:
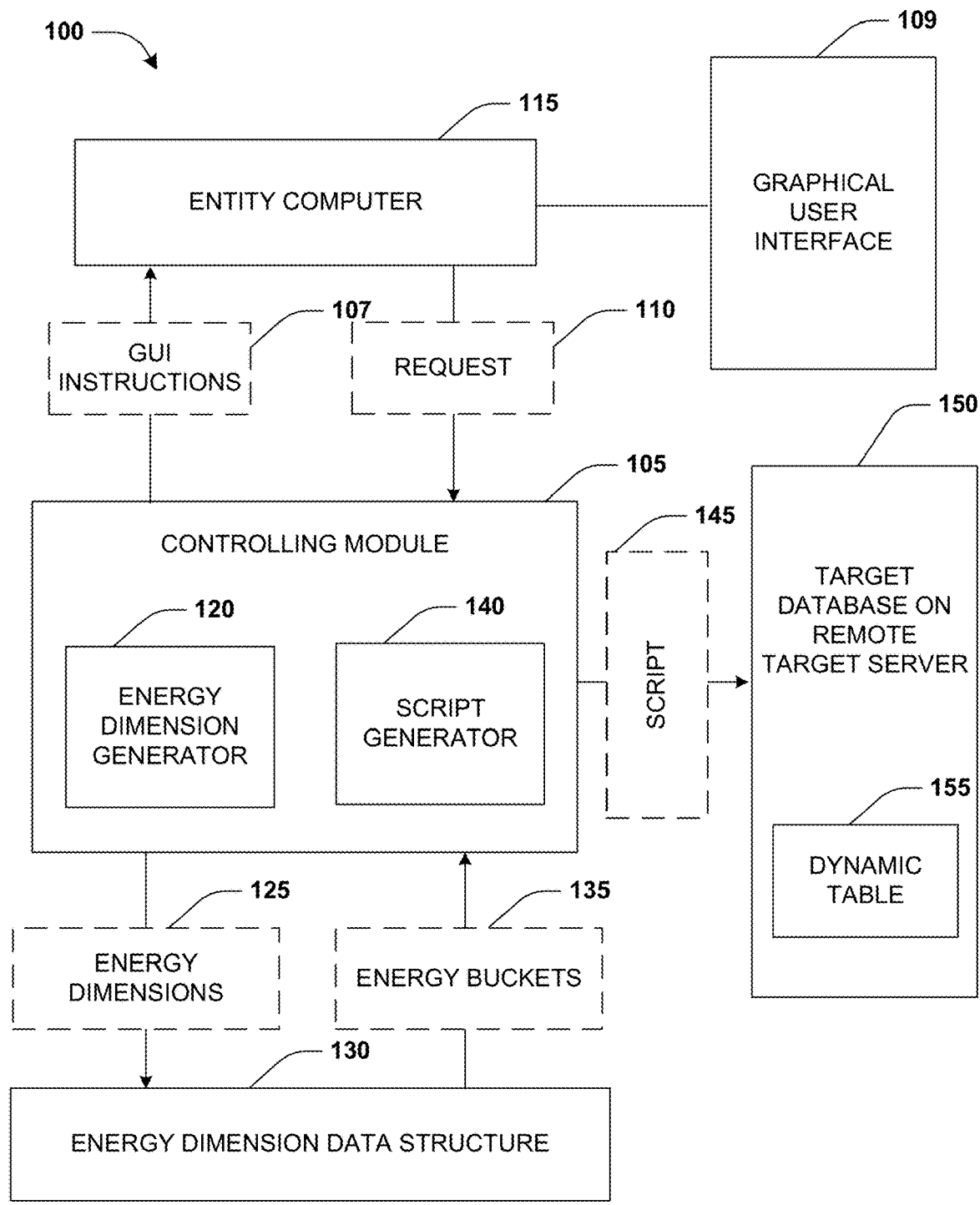
FIG. 1 illustrates an embodiment of a system associated with flexible energy information aggregation.

Computerized systems and methods are described herein that that implement a graphical user interface for controlling energy information aggregation. In one embodiment, the graphical user interface is employed in a centralized manner to flexibly control aggregation of energy information from a target database. Specified energy information may be requested to perform a task. The task can include analyzing energy-related behavior, identifying trends in energy usage, predicting hardware problems, or taking physical action to repair hardware or prevent hardware failure.

The target database may store a large amount of energy information in data records collected from a plurality of sources. For example, the target data can store meter data, item data, billing data, etc. of a large number of consumers. Thus, the energy information stored by the target database may be diverse in terms of energy dimension, format, type, unit or other aspect.

Accurate aggregation of energy information that is relevant to a specified task can depend upon properly considering the variety of energy dimensions associated with data in the target database. For example, energy information in the target database that is associated with energy dimensions corresponding to the task may be relevant, and thus may be aggregated for the task. Energy information in the target database that is not associated with the energy dimensions corresponding to the task may not be relevant, and thus should not be aggregated for the task.

The disclosed system for flexible energy information aggregation improves existing technological processes for aggregating energy information by providing the graphical user interface that defines and controls a request for energy information aggregation. Thus, in one embodiment, the present system eliminates the use of custom query systems that require specific queries to be defined for each request (usually multiple queries to different systems). Rather in the present system, a script is generated based upon a request, and the script is executed on the target database to generate the aggregated energy information. The script may be constructed through dynamic SQL, for example.

The graphical user interface provides for a flexible and user-friendly interface through which scripts can be generated. The scripts are configured to extract relevant energy information in a targeted manner based upon a plurality of dimensions.

Thus, the present system improves existing technological processes for aggregating energy information by eliminating the need to use existing inflexible interfaces that cannot extract the relevant energy information with precision. The inflexible interfaces do not allow for the selection and combination of energy dimensions or data sources to take into account when aggregating. Thus, the system solves technical problems relating to errors, time delays and wasted resources caused by the extraction of irrelevant energy information and/or the failure to extract some relevant energy information.

The present system also improves existing technological processes for aggregating energy information by eliminating the need to employ a team of programmers to analyze the target database to develop an understanding, and then manually write code configured to aggregate the energy information based upon the understanding. By doing so, the system solves technical problems relating to errors, time delays and wasted resources caused by the use of the team of programmers to manually write the code.

The flexible energy information aggregation system is flexible by virtue of being capable of configuring and combining energy dimensions, data sources and other aspects to be taken into account when aggregating energy information. Similarly, the graphical user interface is centralized by virtue of being implemented as a single point of access that can be accessed from various remote devices to flexibly aggregate energy information.

The flexible energy information aggregation system also improves existing technological processes by improving the functionality of hardware, such a power grid or other energy-supplying infrastructure. For example, aggregated energy information can be analyzed to identify indications of hardware failure. The hardware failure can be remedied or preempted by modifying operation of the hardware, rerouting energy flow, or repairing or replacing one or more components of the hardware. Thus, the system mitigates or prevents hardware failures, and also mitigates delays and expenses caused by such hardware failures.

With reference to FIG. 1, one embodiment of a computerized system 100 associated with flexible energy information aggregation is illustrated. A controlling module 105 generates graphical user interface instructions 107. The controlling module 105 transmits the graphical user interface instructions 107 to an entity computer 115.

The entity computer 115 executes the graphical user interface instructions 107 to display a graphical user interface 109 including a plurality of selectable inputs. The graphical user interface 109 is used by the entity computer 115 to generate a request 110 requesting that a script be generated. The script that is to be generated may be configured to perform flexible energy information aggregation. The entity computer 115 transmits the request 110 to the controlling module 105 over a network connection.

The controlling module 105 utilizes an energy dimension generator 120 to generate energy dimensions 125 (based upon the request 110) that are used to select the energy information to be aggregated. In one embodiment, the energy dimensions 125 reflect selectable inputs that were selected by a user of the graphical user interface 109 to generate the request 110. For example, the energy dimensions 125 may specify that energy information be aggregated by market participant or by supplier.

The energy dimensions 125 are used to analyze an energy dimension data structure 130 in order to identify data records to be considered for the request 110. The energy dimension data structure 130 includes data records of various energy dimensions that are available to be implemented for aggregating energy information. The energy dimension data structure 130 also includes data records of the various attributes associated with each energy dimension.

The controlling module 105 uses the energy dimension data structure 130 to generate energy buckets 135 representative of combinations of the energy dimensions 125. For example, the controlling module may select energy dimensions in the energy dimension data structure 130 that match the energy dimensions 125 determined from the request 110. In some examples, the controlling module 105 determines a plurality of unique combinations and/or permutations of the energy dimensions 125. The energy buckets 135 may include an energy bucket for each unique combination and/or permutation of the energy dimensions 125.

The controlling module 105 utilizes a script generator 140 to generate a script 145 based upon the energy buckets 135. The script 145 is configured to perform the flexible energy information aggregation. The controlling module 105 transmits the script 145 to a target database 150 on a remote target server.

The controlling module 105 is configured to cause the execution of the script 145 on the target database 150. Execution of the script 145 initiates the extraction of data that matches each energy bucket of the energy buckets 135. The data is extracted into a dynamic table 155 in the target database 150. An energy operation that is identified by the request 110 is run on the extracted data to generate aggregated energy information in the dynamic table 155.

The graphical user interface 109 is then controlled to display customized energy information based upon the aggregated energy information. For example, the customized energy information may be created by formatting the aggregated energy information in accordance with settings of the entity computer 115, and may then be provided for display in the graphical user interface 109.

Thus, the graphical user interface 109 is used to efficiently and flexibly aggregate energy information from the target database 150. The energy information is aggregated in response to a single request generated using the graphical user interface 109, which decreases the time and resources that would otherwise need to be used to manually write code to identify and aggregate the relevant energy information. The graphical user interface 109 is accessible from any computing device than can establish a network connection with the controlling module 105, which increases the ease with which the energy information can be aggregated.

The customized energy information also provides an improved interface that assembles the energy information and modifies the assembled energy information. In one embodiment, the improved interface modifies the energy information by identifying and removing redundancies and conflicts between the energy information associated with different sources. The improved interface also serves to decrease the time and resources that would be needed to separately and independently access, review, and interact with energy information using existing techniques that are performed by submitting and processing multiple customized queries.

Figure 2:
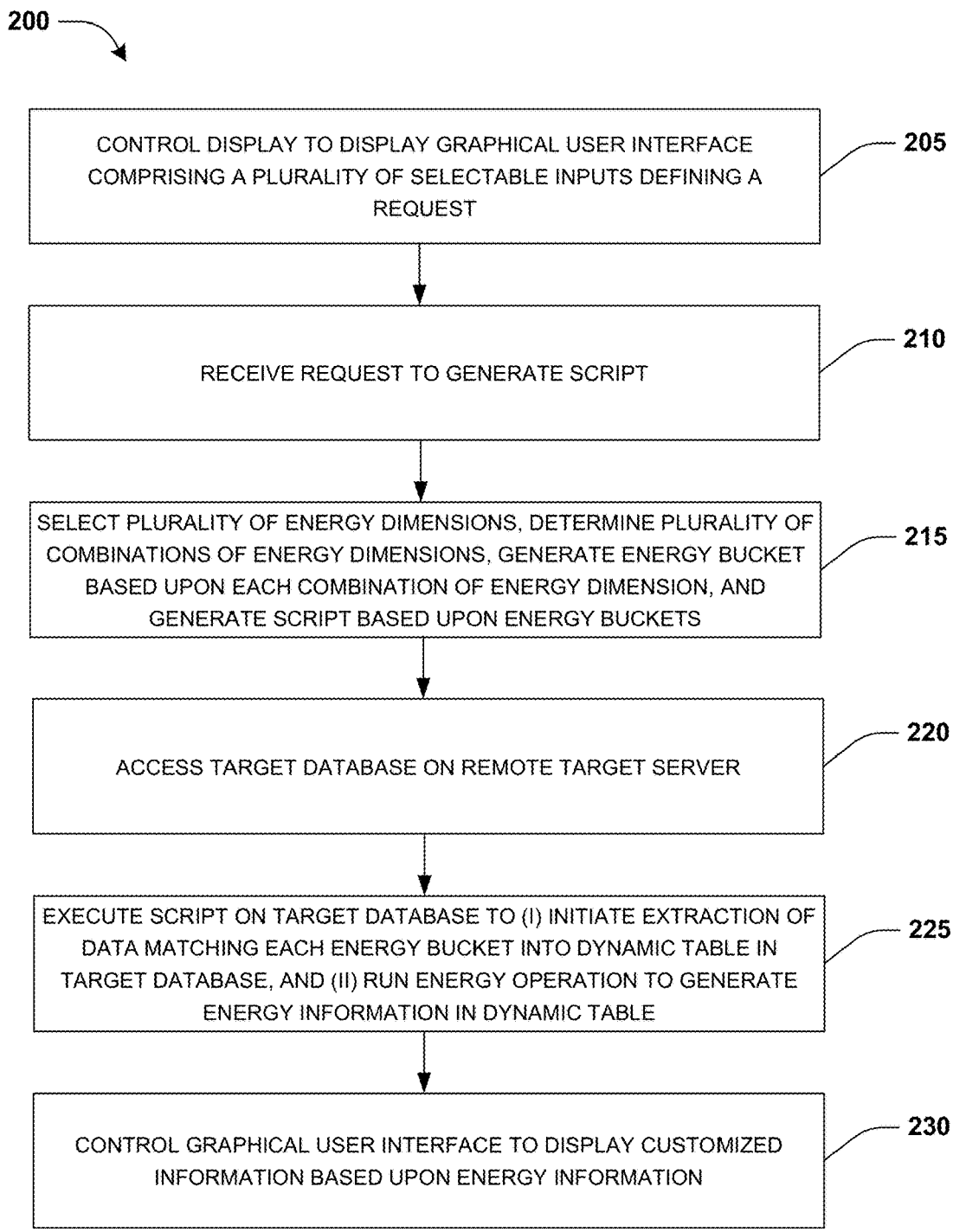
FIG. 2 illustrates an embodiment of a method associated with flexible energy information aggregation.

With reference to FIG. 2, one embodiment of a computer implemented method 200 associated with flexible energy information aggregation is illustrated. In one embodiment, the method 200 is performed by the controlling module 105 utilizing various computing resources of the computer 515. The computing resources, such as the processor 520, are used for executing instructions associated with flexible energy information aggregation as described herein. Memory 535 and/or disks 555 are used for storing data structures of commands for performing flexible energy information aggregation as described herein. Network hardware is used for communication of script commands, request commands, and/or graphical user interface data between the computer 515 and remote computers over a network, such as for providing a flexible energy information aggregation interface to devices. The method 200 is triggered upon determining that an energy information aggregation command is to be executed.

In one embodiment, the controlling module 105 generates graphical user interface instructions 107 that cause the computer to generate the graphical user interface 109. A network connection is established between the controlling module 105 and the entity computer 115. The graphical user interface instructions 107 for the graphical user interface 109 are transmitted to the entity computer 115 over the network connection.

In some examples, the graphical user interface instructions 107 are provided in response to receiving a request from the entity computer 115 for an energy information aggregation interface. The request may have been generated by a web browser operating on the entity computer 115. In one embodiment, the request may have been generated as a part of a web application.

Figure 3A:
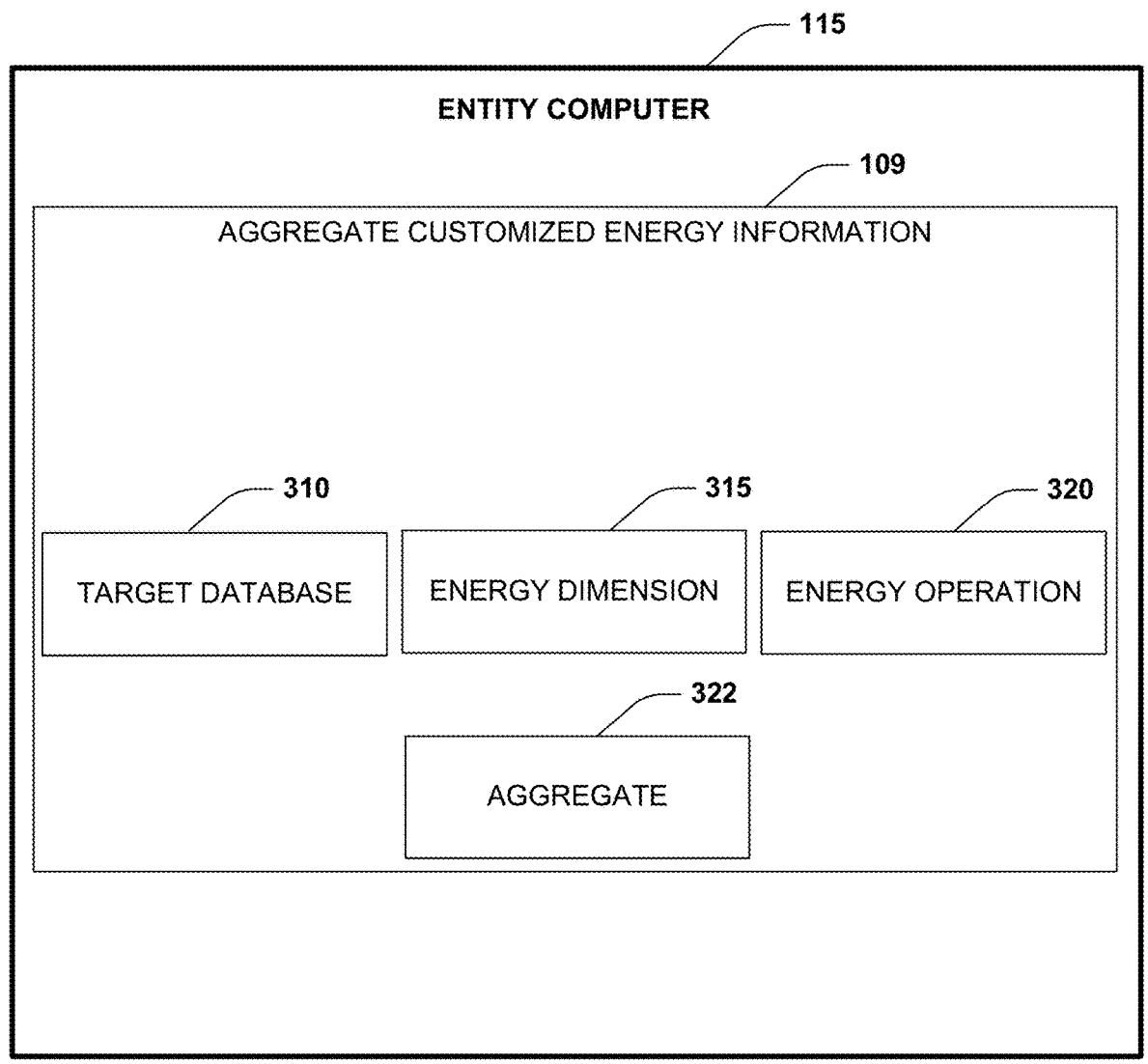
FIG. 3A illustrates an embodiment of a system associated with flexible energy information aggregation, where a graphical user interface is displayed.

Upon receiving the graphical user interface instructions 107, the entity computer 115 uses the graphical user interface instructions 107 to generate and display the graphical user interface 109 on a screen, as illustrated in FIG. 3A. In some examples, the graphical user interface 109 is rendered within the web browser.

At 205, a display is controlled to display the graphical user interface 109, which may include an energy information aggregation interface. The energy information aggregation interface includes a plurality of selectable inputs. The selectable inputs of the energy information aggregation interface can be used (by a user of the entity computer 115) to define a request to generate a script associated with flexible energy information aggregation. The script can be applied to a target database 150 to aggregate energy information from the target database 150.

In one embodiment, the graphical user interface 109 includes multiple input options, for example, a first selectable input 310, a second selectable input 315, and a third selectable input 320, as illustrated in FIG. 3A. Different amounts of input options may be implemented. Each selectable input can be a menu comprising a plurality of options, a text input box, or another type of input.

The first selectable input 310 is configurable to define the target database 150 from which energy information is to be aggregated. In some examples, the first selectable input 310 may be used to receive a target address of the target database 150 or a target server hosting the target database 150. The target address may be a URL, an IP address, or another type of address.

The second selectable input 315 is configurable to define one or more energy dimensions to be used to aggregate the energy information. The energy dimensions can include various market participants, such as buyers or sellers. Alternatively and/or additionally, energy dimensions 315 can include a type of data, such as meter data, item data, or billed data. Alternatively and/or additionally, energy dimensions 315 can include a type of channel from which data may be retrieved, such a type of meter.

The third selectable input 320 is configurable to define one or more energy operations to be run on data extracted from the target database 150. The energy operations can include a formula, a complex model, a sum, an average, etc.

In some examples, the graphical user interface 109 includes one or more additional selectable inputs. For example, a fourth selectable input may be configurable to define one or more interval sizes of data to be extracted. A fifth selectable input may be configurable to define a unit of measure to be used when presenting the customized energy information. A sixth selectable input may be configurable to define one or more time frames for data to be extracted or to be used when presenting the customized energy information.

The target database 150 defined via the first selectable input 310 can be targeted for energy information aggregation. In one embodiment, a network connection is established to the target database 150, and the target database 150 is analyzed using the network connection. The one or more energy dimensions defined via the second selectable input 315 can later be used as criteria for determine which data to extract, and which data to not extract. The values defined for each selectable input can be transmitted to the controlling module 105 in response to selection of an activation button 322 configured to start the flexible energy information aggregation.

Accordingly, using the graphical user interface 109, a user can launch the flexible energy information aggregation that can extract energy information from the target database 150. The user would thus not need to analyze the target database 150 to develop an understanding or a model of the target database 150. The users would also not need to use the understanding or model to manually write code configured to extract information using the target database 150, the one or more energy dimensions or the one or more energy operations.

The graphical user interface 109 would be accessible from various remote devices in a centralized manner, as the graphical user interface 109 would serve as a connection to a single location which the various remote devices could access to launch flexible energy information aggregations. The centralized nature of the graphical user interface 109 eliminates the need to access multiple interfaces at multiple locations in order to launch flexible energy information aggregations.

Figure 3B:
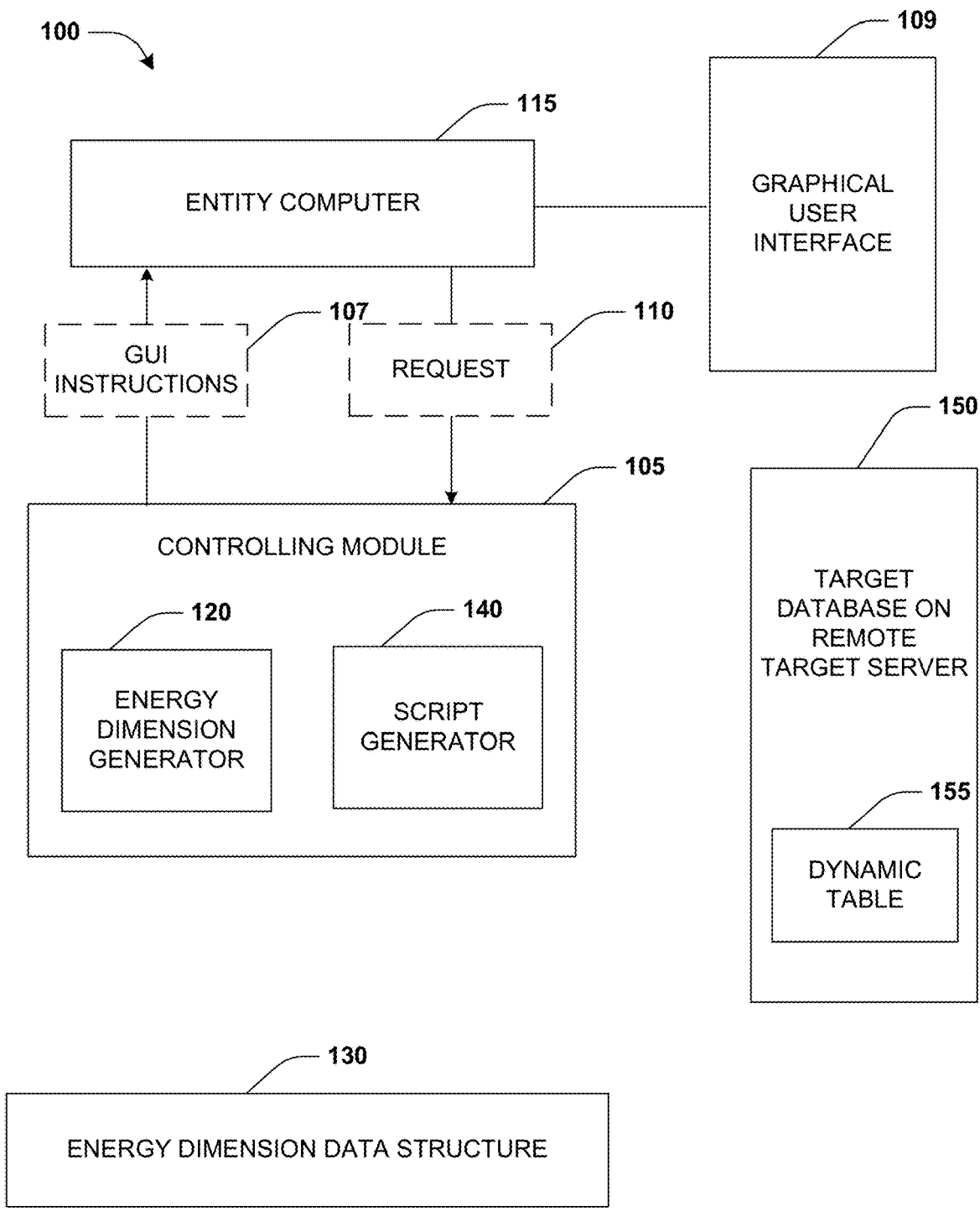
FIG. 3B illustrates an embodiment of a system associated with flexible energy information aggregation, where a request to generate a script associated with flexible energy information aggregation is received.

Selection of the activation button 322 causes the entity computer 115 to generate the request 110. The request 110 is transmitted via the network connection to the controlling module 105, as illustrated in FIG. 3B.

At 210, the controlling module 105 receives the request 110. The controlling module 105 parses the request 110 to identify criteria for creation of a script for flexible energy information aggregation. The criteria includes the plurality of energy dimensions and the energy operations specified in the request 110. The criteria can also include other information that may be used to predict or filter energy dimensions, energy operations or other parameters used to create the script.

Figure 3C:
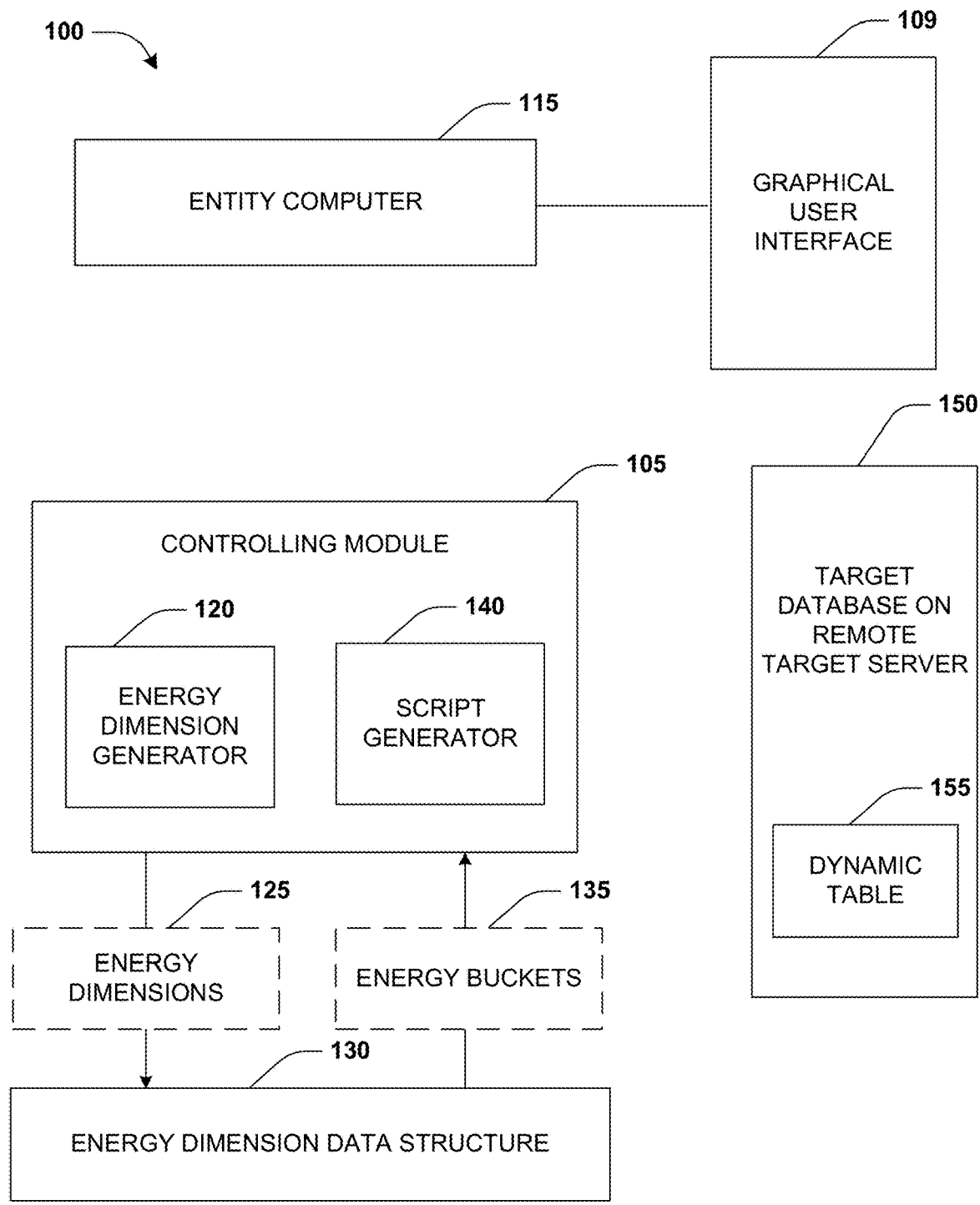
FIG. 3C illustrates an embodiment of a system associated with flexible energy information aggregation, where energy buckets are generated.

The energy dimension generator 120 extracts the energy dimensions 125 from the criteria. The energy dimensions 125 are used to analyze the energy dimension data structure 130, as illustrated in FIG. 3C. In one embodiment, entries in the energy dimensions 125 are compared to entries in the energy dimension data structure 130.

At 215, energy dimensions are selected from available energy dimensions listed in the energy dimension data structure 130. For example, matches between the entries in the energy dimensions 125 and the entries in the energy dimension data structure 130 may be used to select energy dimensions for the script being created.

The selected energy dimensions include energy dimensions that can be considered for implementation in the flexible energy information aggregation. The selected energy dimensions are retrieved from the energy dimension data structure 130 and used to generate the energy buckets 135.

FIG. 3D illustrates an example of entries stored in the energy dimension data structure 130. The entries may be arranged based upon relationships between each energy dimension parameter 320 and a first attribute 305, a second attribute 310, and a third attribute 315 of each energy dimension parameter 320. For example, a first energy dimension corresponding to a supplier may have a first attribute that is a name of the supplier, a second attribute that is a location of the supplier, and a third attribute that is a size of the supplier.

In one embodiment, each entry in the energy dimensions 125 that identifies an energy dimension is compared to the entries of the energy dimension parameter 320. In one embodiment, each entry in the energy dimensions 125 that identifies one or more attributes is compared to the entries of the first attribute 305, the second attribute 310 and/or the third attribute 315.

As mentioned, the energy dimensions associated with matching entries are retrieved from the energy dimension data structure 130. A plurality of combinations and/or permutations of the retrieved energy dimensions are determined. For example, all of the possible unique combinations and/or permutations of the retrieved energy dimensions may be determined.

At 215, in addition to selecting the energy dimensions, the controlling module 105 generates energy buckets 135 for the combinations and/or permutations of energy dimensions. In one embodiment, an energy bucket may be generated for each of the combinations and/or permutations of energy dimensions.

In some examples, each energy dimension defines a collection of attributes that can be used to identify a segment of energy-related information. In some examples, each energy bucket is a data structure that comprises a combination of respective attributes defined by energy dimensions.

Figure 3E:
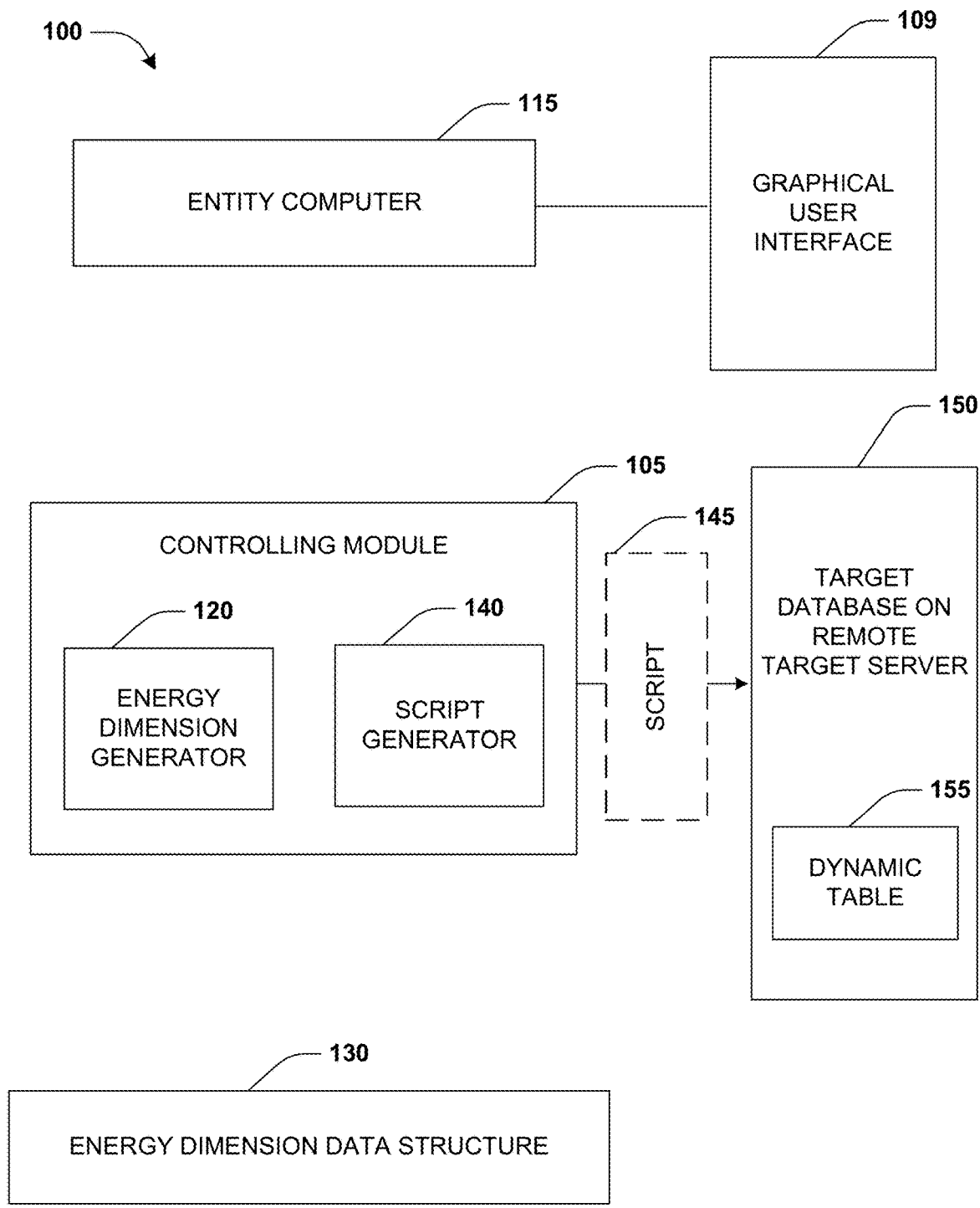
FIG. 3E illustrates an embodiment of a system associated with flexible energy information aggregation, where a script is generated.

At 215, in addition to generating energy buckets 135, the controlling module 105 also uses the script generator 140 to generate the script 145, as illustrated in FIG. 3E. The script 145 is generated based upon the energy buckets 135. For example, the script 145 may include instructions to extract, from the target database 150, energy information matching energy dimensions associated with the energy buckets 135.

In some embodiments, the script 145 is generated based upon the target database 150. For example, the script 145 may be generated in a first format if a determination is made that the target database 150 is a first type of database, while the script 145 may be generated in a second format if a determination is made that the target database 150 is a second type of database.

In some embodiments, the script 145 is generated based upon the energy operations identified in the request. For example, the script 145 may include instructions to run the energy operations on at least some of the energy information extracted from the target database 150.

At 220, the controlling module 105 accesses the target database 150. In one embodiment, the controlling module 105 establishes a network connection with the target server hosting the target database 150. The controlling module 105 then transmits the script 145 to the target database 150 over the network connection.

At 225, the controlling module executes the script 145 on the target database 150. The execution of the script 145 causes an initiation of extraction of data matching each of the energy buckets 135. The data is extracted into a dynamic table 155 in the target database 150.

The execution of the script 145 also causes the running of the energy operations, specified by the request 110, on the extracted data to generate energy information in the dynamic table 155. The execution causes the data that matches each energy bucket to seamlessly be modified on-the-fly by the energy operations. The modification of data by each energy bucket causes the generation of an energy information result in the dynamic table 155. The energy information in the dynamic table 155 may thus include a plurality of energy information results.

The seamless and on-the-fly modification may be performed while the data that matches each energy bucket is stored in the target database 150 on the target server. Thus, the seamless and on-the-fly modification may be performed without copying the data that matches each energy bucket to a remote device (e.g., the entity computer 115 or a different computer) via a network connection. Accordingly, the system improves upon existing techniques that may require the data to be transferred to a different computer to be modified (e.g., thus requiring more time and the use of more bandwidth).

Figure 3F:
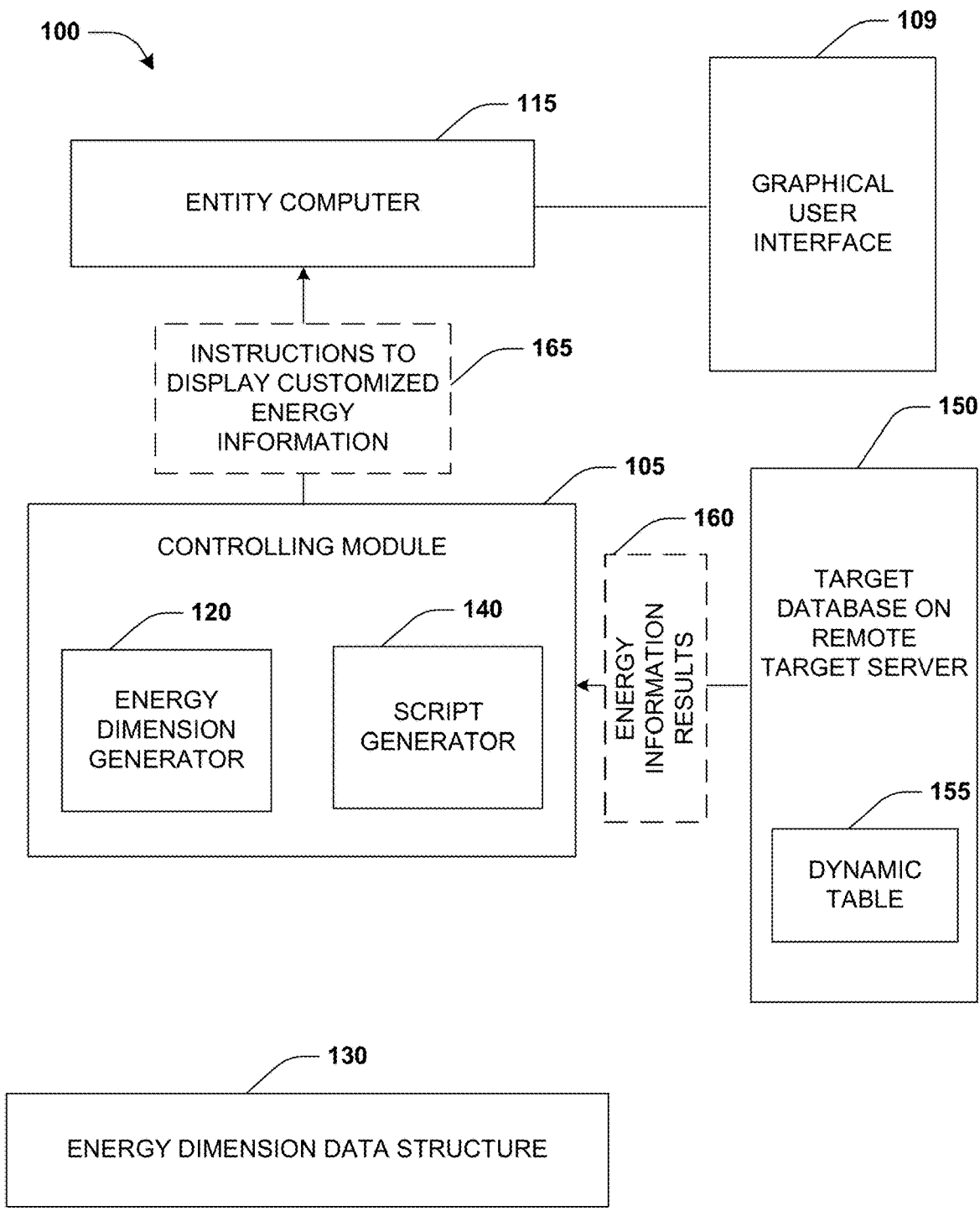
FIG. 3F illustrates an embodiment of a system associated with flexible energy information aggregation, where energy information results are compiled.

As illustrated in FIG. 3F, the energy information in the dynamic table 155 may be retrieved by the controlling module 105 as part of energy information results 160. For example, the energy information results 160 may be transmitted over a network connection between the controlling module 105 and the target database 150.

The controlling module 105 parses the energy information results 160 to identify each energy information result. The controlling module 105 uses the identified energy information results to generate controlling customized energy information instructions 165. The controlling module 105 establishes a network connection to the entity computer 115, and transmits the controlling customized energy information instructions 165 to the entity computer 115.

Figure 3G:
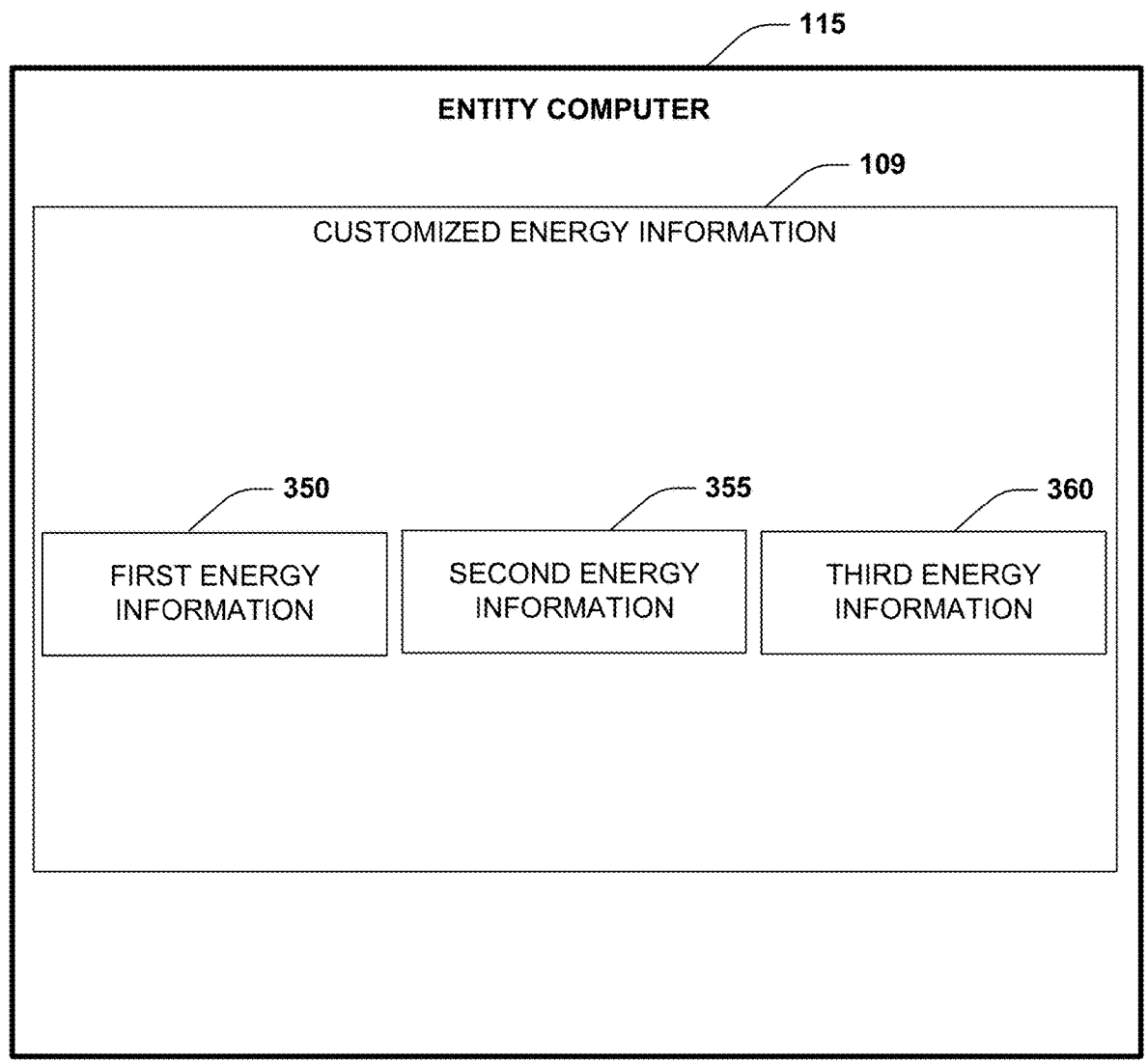
FIG. 3G illustrates an embodiment of a system associated with flexible energy information aggregation, where the graphical user interface is controlled to display customized energy information.

The controlling customized energy information instructions 165 are executed by the entity computer 115. Thus, at 230, the graphical user interface 109 is controlled to display customized energy information, as illustrated in FIG. 3G.

The graphical user interface 109 can display information resulting from the extraction of data from the target database 150 and the application of energy operations to the extracted data. For example, the graphical user interface 109 can display a first graphical representation 350 of a first set of energy information with the energy dimensions of the request 110 and the energy operations of the request 110. The first set of energy information can be associated with a first type of energy, or a first source of information, for example.

The graphical user interface 109 can display a second graphical representation 355 of a second set of energy information with the energy dimensions of the request 110 and the energy operations of the request 110. The second set of energy information can be associated with a second type of energy, or a second source of information, for example.

The graphical user interface 109 can display a third graphical representation 360 of a third set of energy information with the energy dimensions of the request 110 and the energy operations of the request 110. The third set of energy information can be associated with a third type of energy, or a third source of information, for example.

In some examples, after the energy operations are run to generate energy information in the dynamic table 155, one or more additional scripts may be generated. For example, a second script that is configured to identify a second level of energy information may be generated. The second script may be executed on the target database 150.

Execution of the second script may cause the extraction of second data into a second dynamic table in the target database 150. For example, the second data may be extracted from the dynamic table 155 to the second dynamic table. A second energy operation may be run upon the second data in the second dynamic table. The customized energy information (that is displayed at 230) may thus be generated in the second dynamic table. The graphical user interface 109 may display the customized energy information upon retrieving the customized energy information from the second dynamic table.

In some examples, the script 145 or the second script may be configured to aggregate sets of data associated with different units, different time zones, different timeframes, etc. For example, a first set of data associated with a first unit and a second set of data associated with a second unit may be aggregated by converting one or both of the sets of data so that they share a common unit. In another example, a third set of data associated with a first time zone and a fourth set of data associated with a second time zone may be aggregated by converting one or both of the sets of data so that they share a common time zone. In another example, a fifth set of data associated with a first timeframe and a sixth set of data associated with a second timeframe may be aggregated by converting one or both of the sets of data so that they share a common timeframe.

In some examples, the customized energy information may be analyzed to determine energy usage. When the energy usage of a portion of the customized energy information exceeds a threshold usage, that portion of the customized energy information is determined to be associated with a hardware failure. For example, if the first set of energy information (associated with the first graphical representation 350) is indicative of energy usage exceeding the threshold usage, then hardware facilitating the flow or supply of energy that corresponds to the first set of energy information may be determined to have a hardware failure, or predicted to be likely to have a hardware failure.

Actions to avoid or remedy the hardware failure may be determined. For example, options to repair or replace of one or more components associated with the hardware failure may be determined. In another example, an option to redirect a flow of energy may be determined. Corrective instructions to perform the determined actions may be generated. The corrective instructions may be transmitted to a remote device via a network connection. The corrective instructions, when executed, may cause the remote device to perform the actions to avoid or remedy the hardware failure.

In some examples, the customized energy information may be used to resolve discrepancies between different sets of data. In one embodiment, discrepancies in transactions associated with a plurality of interested entities may be identified. For example, data from a buyer of a transaction indicates purchasing a first amount of energy at a first price but corresponding data from a seller of the transaction indicates selling a second amount of energy at a second price. The customized energy information may be used to identify additional context that may be used to determine the actual amount of energy sold, and the actual price at which the energy was sold, in the transaction.

For example, the customized energy information may include records of the transaction maintained by a third party, such as a tax collector. The records maintained by the third party can be used to either select from amongst the data from the buyer and the data from the seller, or to generate different data altogether (e.g., based upon an average of the different records).

To the extent that the terms "database" or "table" are employed in the detailed description or the claims, they are intended to be inclusive of various forms of data storage. In some examples, such forms of data storage include one or more file systems, such as the Hadoop file system.

Figure 4:
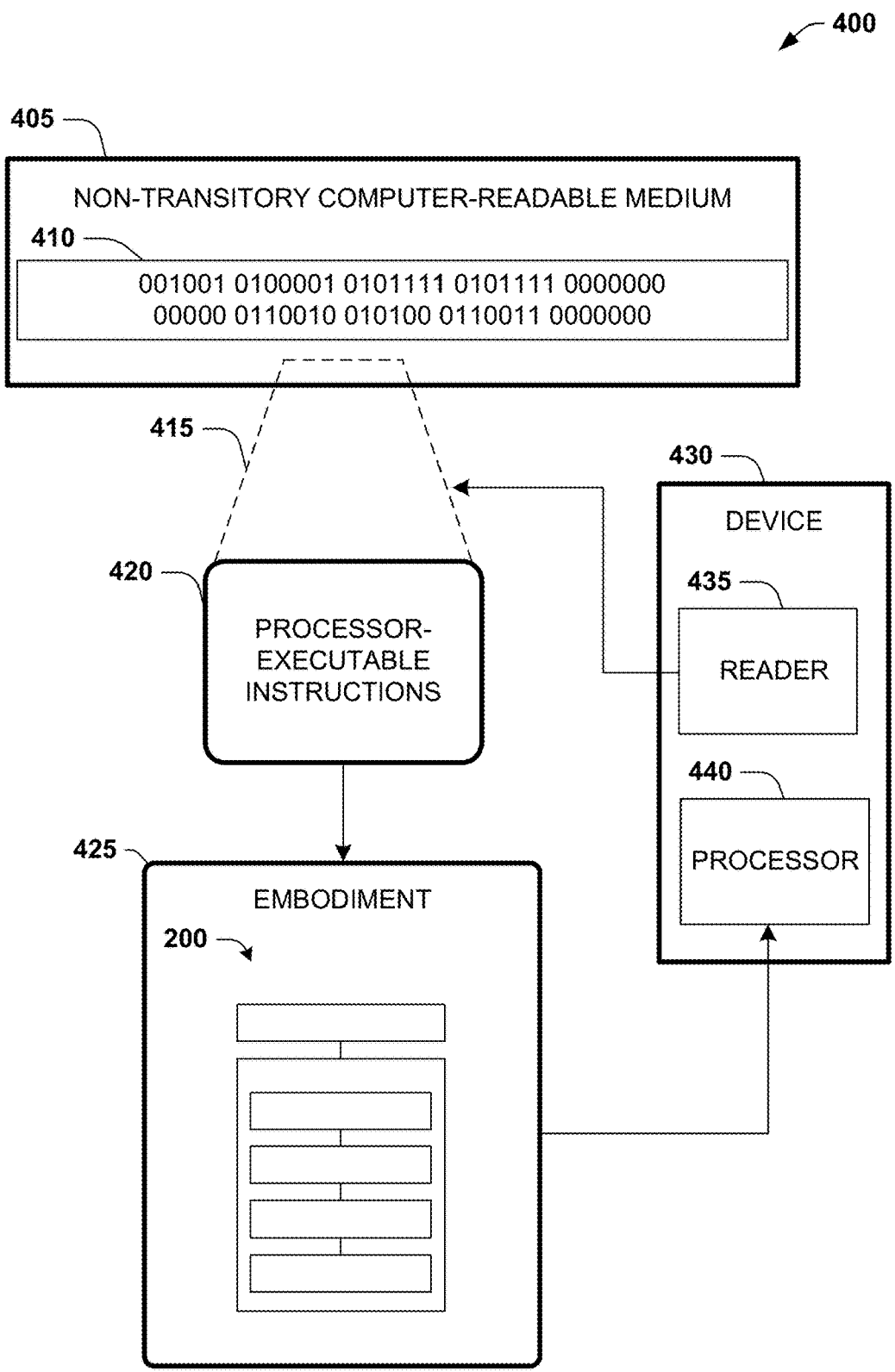
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the controlling module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the, functionality of the controlling module 105, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1, for example.

Figure 5:
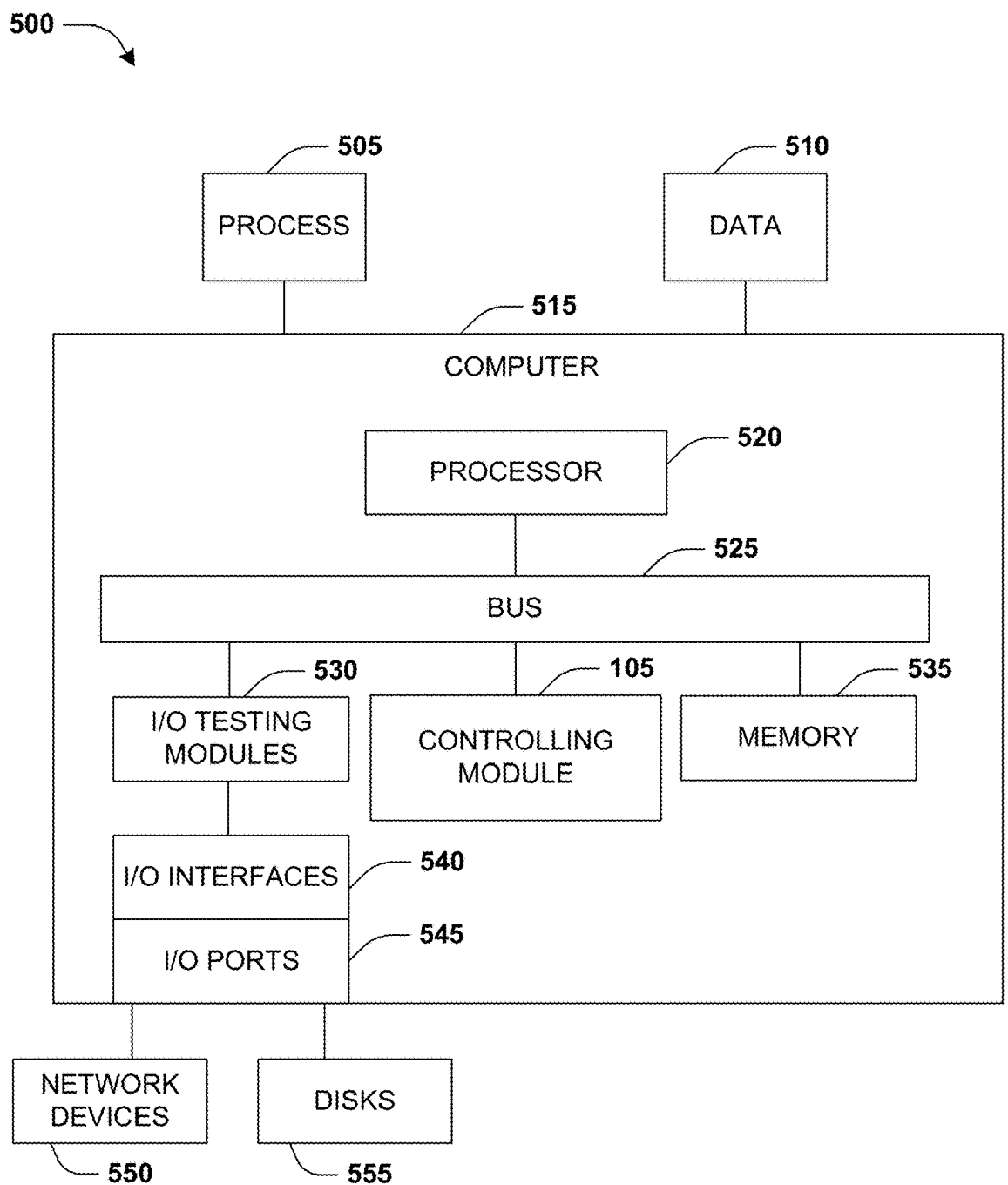
FIG. 5 illustrates an embodiment of a computing system configured with the example systems and/or methods disclosed.

FIG. 5 illustrates an example computing device 500 that is configured and/or programmed with one or more of the example systems and methods described herein, and/or equivalents. The example computing device 500 may be the computer 515 that includes a processor 520, a memory 535, and input/output (I/O) ports 545 operably connected by a bus 525. In one embodiment, the, the computer 515 may include logic of the controlling module 105 configured to facilitate the system 100 and/or the method 200 shown in FIGS. 1-2. In different embodiments, the logic of the controlling module 105 may be implemented in hardware, a non-transitory computer-readable medium 505 with stored instructions, firmware, and/or combinations thereof. While the logic of the controlling module 105 is illustrated as a hardware component attached to the bus 525, it is to be appreciated that in other embodiments, the logic of the controlling module 105 could be implemented in the processor 520, stored in memory 535, or stored in disk 555.

In one embodiment, logic of the controlling module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the controlling module 105 may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multi-processor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with I/O devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

Figure 6:
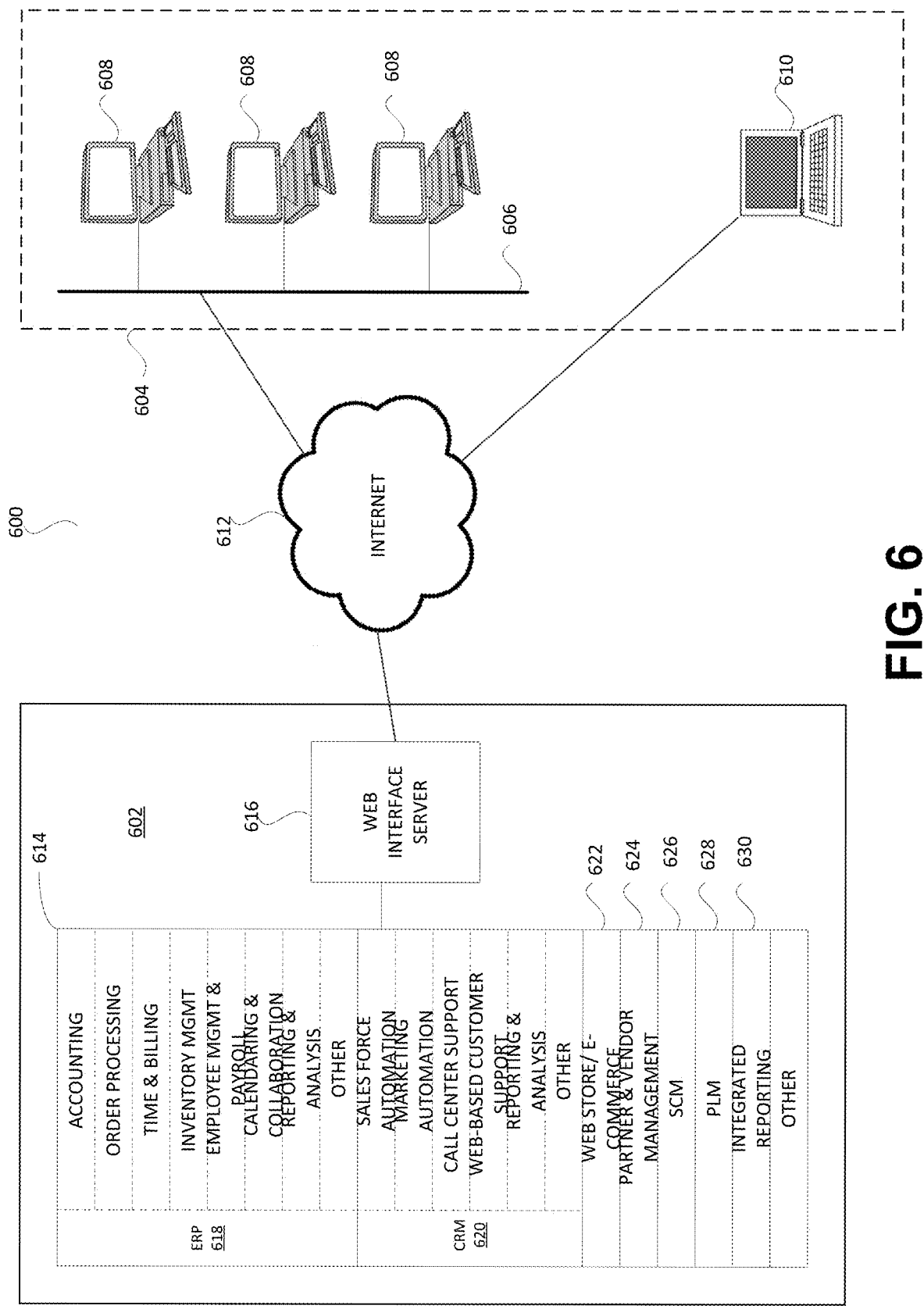
FIG. 6 illustrates an embodiment of an integrated business system and an enterprise network in which an embodiment of the invention may be implemented.

FIG. 6 is a diagram illustrating a system 600 in which an embodiment of the invention may be implemented. Enterprise network 604 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection.

For simplicity and clarity of explanation, the enterprise network 604 is represented by an on-site local area network 606 to which a plurality of personal computers 608 are connected, each generally dedicated to a particular end user, such as a service agent or other employee (although such dedication is not required), along with an exemplary remote user computer 610 that can be, for example, a laptop computer or tablet computer of a traveling employee having internet access through a public Wi-Fi access point, or other internet access method. The end users (consumers) associated with computers 608 and 610 may possess an internet-enabled smartphone or other electronic device (such as a PDA, tablet, laptop computer) having wireless internet access or other synchronization capabilities. Users of the enterprise network 604 interface with the integrated business system 602 across the Internet 612 or another suitable communications network or combination of networks.

Integrated business system 602, which may be hosted by a dedicated third party, may include an integrated business server 614 and a web interface server 616, coupled as shown in FIG. 6. It is to be appreciated that either or both of the integrated business server 614 and the web interface server 616 may be implemented on one or more different hardware systems and components, even though represented as singular units in FIG. 6.

In a typical example in which system 602 is operated by a third party for the benefit of multiple account owners/tenants, each of whom is operating a business, integrated business server 614 comprises an ERP module 618 and further comprises a CRM module 620. In many cases, it will be desirable for the ERP module 618 to share methods, libraries, databases, subroutines, variables, etc., with CRM module 620, and indeed ERP module 618 may be intertwined with CRM module 620 into an integrated Business Data Processing Platform (which may be single tenant, but is typically multi-tenant).

The ERP module 618 may include, but is not limited to, a finance and accounting module, an order processing module, a time and billing module, an inventory management and distribution module, an employee management and payroll module, a calendaring and collaboration module, a reporting and communication module, and other ERP-related modules. The CRM module 620 may include, but is not limited to, a sales force automation (SFA) module, a marketing automation module, a contact list module (not shown), a call center support module, a web-based customer support module, a reporting and communication module, and other CRM-related modules.

The integrated business server 614 (or multi-tenant data processing platform) further may provide other business functionalities including a web store/eCommerce module 622, a partner and vendor management module 624, and an integrated reporting module 630. An SCM (supply chain management) module 626 and PLM (product lifecycle management) module 628 may also be provided. Web interface server 616 is configured and adapted to interface with the integrated business server 614 to provide one or more web-based user interfaces to end users of the enterprise network 604.

The integrated business system shown in FIG. 6 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 7:
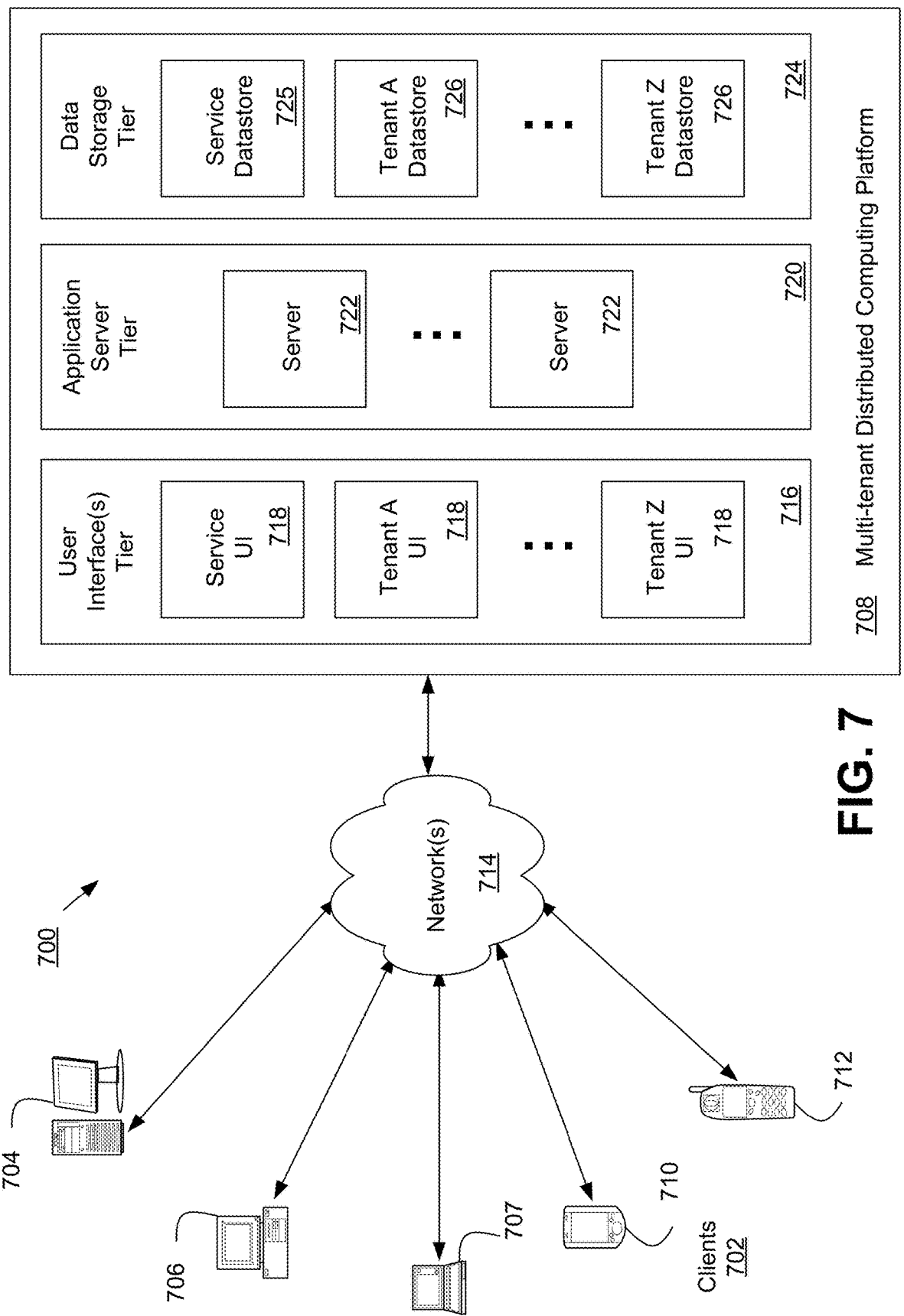
FIG. 7 illustrates an embodiment of a multi-tenant distributed computing service platform.

FIG. 7 is a diagram illustrating elements or components of an example operating environment 700 in which an embodiment of the invention may be implemented. As shown, a variety of clients 702 incorporating and/or incorporated into a variety of computing devices may communicate with a distributed computing service/platform 708 through one or more networks 714. For example, a client may incorporate and/or be incorporated into a client application (e.g., software) implemented at least in part by one or more of the computing devices.

Examples of suitable computing devices include personal computers, server computers 704, desktop computers 706, laptop computers 708, notebook computers, tablet computers or personal digital assistants (PDAs) 710, smart phones 712, cell phones, and consumer electronic devices incorporating one or more computing device components, such as one or more electronic processors, microprocessors, central processing units (CPU), or controllers. Examples of suitable networks 714 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 708 may include multiple processing tiers, including a user interface tier 716, an application server tier 720, and a data storage tier 724. The user interface tier 716 may maintain multiple user interfaces 718, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 724 may include one or more data stores, which may include a Service Data store 725 and one or more Tenant Data stores 726.

Each tenant data store 726 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 708 may be multi-tenant and service platform 708 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 722 that are part of the platform's Application Server Tier 720.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions.

In addition to ERP and CRM functions, a business information system/platform (such as element 708 of FIG. 7(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 722 that are part of the platform's Application Server Tier 720.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 708 of FIG. 7).

As noted with regards to FIG. 6, the integrated business system shown in FIG. 7 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor of a computer cause the computer to:
    control, by at least the processor, a display of the computer to display a graphical user interface that comprises a plurality of selectable inputs that define a request;
    receive, by at least the processor, the request, via the graphical user interface, to generate a script associated with flexible energy information aggregation, wherein the request identifies (i) a target database, (ii) a plurality of energy dimensions, and (iii) at least one energy operation;
    in response to the request, (i) select, by at least the processor, the plurality of energy dimensions from a set of available energy dimensions, wherein each energy dimension of the plurality of energy dimensions defines a collection of attributes usable to identify a segment of energy-related information,
        (ii) determine, by at least the processor, a plurality of combinations of the plurality of energy dimensions,
        (iii) generate, by at least the processor, an energy bucket for each combination of the plurality of energy dimensions, and
        (iv) generate, by at least the processor, the script to be configured to extract identified energy information based upon the energy buckets;
    access, by at least the processor, the target database on a remote target server via a network connection;
    execute, by at least the processor, the script on the target database to (i) initiate extraction of data from the target database that matches at least the collection of attributes from an associated energy dimension from one or more of the energy buckets and place the data extracted into a dynamic table in the target database, and (ii) run the at least one energy operation on the data extracted into the dynamic table to generate energy information, corresponding to the request, in the dynamic table; and
    control, by at least the processor, the graphical user interface to display customized energy information based upon the energy information.

2. The non-transitory computer-readable medium of claim 1, wherein the graphical user interface is accessible by a plurality of remote devices in a centralized manner to run energy operations over at least one network connection, and wherein the graphical user interface is usable to generate energy information scripts for running the energy operations without a manual writing of code.

3. The non-transitory computer-readable medium of claim 1, wherein the executing the script on the target database causes the data that matches each energy bucket to seamlessly be modified on-the-fly by the at least one energy operation while the data is stored in the target database on the remote target server.

4. The non-transitory computer-readable medium of claim 1, further comprising instructions that when executed by at least the processor cause the computer to:
    generate a second script to identify a second level of energy information based upon the energy information in the dynamic table; and
    execute the second script on the target database to (i) initiate extraction of second data into a second dynamic table in the target database, and (ii) run a second energy operation on the second data extracted into the second dynamic table to generate the customized energy information in the second dynamic table.

5. The non-transitory computer-readable medium of claim 1, further comprising instructions that when executed by at least the processor cause the computer to:
    analyze the customized energy information to identify energy usage exceeding a threshold usage;
    in response to determining that the energy usage exceeds the threshold usage in a first portion of the customized energy information, determine that the first portion is associated with a hardware failure;
    generate corrective instructions to perform actions to correct the hardware failure; and
    transmit the corrective instructions to a remote device via a network connection.

6. The non-transitory computer-readable medium of claim 1, wherein each energy bucket is a data structure comprising a combination of respective attributes defined by energy dimensions used to generate the energy bucket.

7. The non-transitory computer-readable medium of claim 1, further comprising instructions that when executed by at least the processor cause the computer to:
    identify discrepancies in transactions associated with a plurality of interested entities; and
    resolve the discrepancies based upon the customized energy information.

8. A computing system, comprising:
    a processor connected to memory; and
    a controlling module stored on a non-transitory computer readable medium and configured with instructions that when executed by the processor cause the processor to:
    control a display of the computer to display a graphical user interface that comprises a plurality of selectable inputs that define a request;
    receive the request, via the graphical user interface, to generate a script associated with flexible energy information aggregation, wherein the request identifies (i) a target database, (ii) a plurality of energy dimensions, and (iii) at least one energy operation;
    in response to the request, (i) select the plurality of energy dimensions from a set of available energy dimensions, wherein each energy dimension of the plurality of energy dimensions defines a collection of attributes usable to identify a segment of energy-related information,
        (ii) determine a plurality of combinations of the plurality of energy dimensions,
        (iii) generate an energy bucket for each combination of the plurality of energy dimensions, and (iv) generate the script to be configured to extract identified energy information based upon the energy buckets;

access the target database on a remote target server via a network connection;

execute the script on the target database to (i) initiate extraction of data from the target database that matches at least the collection of attributes from an associated energy dimension from one or more of the energy buckets and place the data extracted into a dynamic table in the target database, and (ii) run the at least one energy operation on the data extracted into the dynamic table to generate energy information, corresponding to the request, in the dynamic table; and control the graphical user interface to display customized energy information based upon the energy information.

9. The computing system of claim 8, wherein the graphical user interface is accessible by a plurality of remote devices in a centralized manner to run energy operations over at least one network connection, and wherein the graphical user interface is usable to generate energy information scripts for running the energy operations without a manual writing of code.

10. The computing system of claim 8, wherein the executing the script on the target database causes the data that matches each energy bucket to seamlessly be modified on-the-fly by the at least one energy operation while the data is stored in the target database on the remote target server.

11. The computing system of claim 8, wherein the controlling module is further configured with instructions that when executed by the processor cause the processor to:

generate a second script to identify a second level of energy information based upon the energy information in the dynamic table; and execute the second script on the target database to (i) initiate extraction of second data into a second dynamic table in the target database, and (ii) run a second energy operation on the second data extracted into the second dynamic table to generate the customized energy information in the second dynamic table.

12. The computing system of claim 8, wherein the controlling module is further configured with instructions that when executed by the processor cause the processor to:

analyze the customized energy information to identify energy usage exceeding a threshold usage;

in response to determining that the energy usage exceeds the threshold usage in a first portion of the customized energy information, determine that the first portion is associated with a hardware failure;

generate corrective instructions to perform actions to correct the hardware failure; and transmit the corrective instructions to a remote device via a network connection.

13. The computing system of claim 8, wherein each energy bucket is a data structure comprising a combination of respective attributes defined by energy dimensions used to generate the energy bucket.

14. The computing system of claim 8, wherein the controlling module is further configured with instructions that when executed by the processor cause the processor to:

identify discrepancies in transactions associated with a plurality of interested entities; and resolve the discrepancies based upon the customized energy information.

15. A computer-implemented method performed by a computing device comprising a processor, the computer-implemented method comprising:

controlling, by at least the processor, a display to display a graphical user interface that comprises a plurality of selectable inputs that define a request;

receiving, by at least the processor, the request, via the graphical user interface, to generate a script associated with flexible energy information aggregation, wherein the request identifies (i) a target database, (ii) a plurality of energy dimensions, and (iii) at least one energy operation;

in response to the request, (i) selecting, by at least the processor, the plurality of energy dimensions from a set of available energy dimensions, wherein each energy dimension of the plurality of energy dimensions defines a collection of attributes usable to identify a segment of energy-related information, (ii) determining, by at least the processor, a plurality of combinations of the plurality of energy dimensions, (iii) generating, by at least the processor, an energy bucket for each combination of the plurality of energy dimensions, and (iv) generating, by at least the processor, the script to be configured to extract identified energy information based upon the energy buckets;

accessing, by at least the processor, the target database on a remote target server via a network connection;

executing, by at least the processor, the script on the target database to (i) initiate extraction of data from the target database that matches at least the collection of attributes from an associated energy dimension from one or more of the energy buckets and place the data extracted into a dynamic table in the target database, and (ii) run the at least one energy operation on the data extracted into the dynamic table to generate energy information, corresponding to the request, in the dynamic table; and controlling, by at least the processor, the graphical user interface to display customized energy information based upon the energy information.

16. The computer-implemented method of claim 15, wherein the graphical user interface is accessible by a plurality of remote devices in a centralized manner to run energy operations over at least one network connection, and wherein the graphical user interface is usable to generate energy information scripts for running the energy operations without a manual writing of code.

17. The computer-implemented method of claim 15, wherein the executing the script on the target database causes the data that matches each energy bucket to seamlessly be modified on-the-fly by the at least one energy operation while the data is stored in the target database on the remote target server.

18. The computer-implemented method of claim 15, further comprising:

generating a second script to identify a second level of energy information based upon the energy information in the dynamic table; and executing the second script on the target database to (i) initiate extraction of second data into a second dynamic table in the target database, and (ii) run a second energy operation on the second data extracted into the second dynamic table to generate the customized energy information in the second dynamic table.

19. The computer-implemented method of claim 15, further comprising:

analyzing the customized energy information to identify energy usage exceeding a threshold usage;

in response to determining that the energy usage exceeds the threshold usage in a first portion of the customized energy information, determining that the first portion is associated with a hardware failure;

generating corrective instructions to perform actions to correct the hardware failure; and transmitting the corrective instructions to a remote device via a network connection.

20. The computer-implemented method of claim 15, further comprising:

identifying discrepancies in transactions associated with a plurality of interested entities; and resolving the discrepancies based upon the customized energy information.

* * * * *